(12) United States Patent
Suzuki et al.

(10) Patent No.: US 10,207,601 B2
(45) Date of Patent: Feb. 19, 2019

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Kazuya Suzuki, Aichi-ken (JP); Masato Arashi, Aichi-ken (JP); Akira Kaneko, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/337,314

(22) Filed: Oct. 28, 2016

(65) Prior Publication Data

US 2017/0120778 A1   May 4, 2017

(30) Foreign Application Priority Data

Nov. 4, 2015   (JP) ................. 2015-216743

(51) Int. Cl.
*B60N 2/16* (2006.01)
*B60N 2/68* (2006.01)

(52) U.S. Cl.
CPC .......... *B60N 2/1615* (2013.01); *B60N 2/165* (2013.01); *B60N 2/168* (2013.01); *B60N 2/1635* (2013.01); *B60N 2/688* (2013.01)

(58) Field of Classification Search
CPC .... B60N 2/1615; B60N 2/1635; B60N 2/168; B60N 2/165; B60N 2/688

USPC .......................................... 297/216.1, 344.15
See application file for complete search history.

(56) References Cited

U.S. PATENT DOCUMENTS

| 4,790,597 | A | 12/1988 | Bauer et al. |
|---|---|---|---|
| 4,906,023 | A | 3/1990 | Kreger et al. |
| 6,299,252 | B1 | 10/2001 | Frohnhaus et al. |
| 7,036,878 | B2 * | 5/2006 | Masutani ............ B60N 2/1615 297/216.1 X |
| 7,314,249 | B2 | 1/2008 | Becker et al. |

FOREIGN PATENT DOCUMENTS

| DE | 4240250 | 5/1994 |
|---|---|---|
| EP | 1 813 465 | 8/2007 |
| JP | 7-108860 | 4/1995 |
| JP | 2874335 | 3/1999 |
| JP | 2001-213273 | 8/2001 |
| JP | 2015-67135 | 4/2015 |
| WO | 2015/087401 | 6/2015 |

OTHER PUBLICATIONS

Japanese Office Action for JP App. No. 2015-216743 dated Sep. 26, 2017, along with English-language translation thereof.
French Preliminary Search Report for FR App. No. 1660573 dated Apr. 10, 2018, along with English-language translation thereof.

\* cited by examiner

*Primary Examiner* — Anthony D Barfield
(74) *Attorney, Agent, or Firm* — Greenblum & Bernstein, P.L.C.

(57) ABSTRACT

A vehicle seat includes: a seat cushion; a base provided on a vehicle body; a seat lifter configured to adjust a height of the seat cushion by a rotational motion of a link connecting the seat cushion to the base; and a fixture of a seat belt, the fixture being attached to the link.

9 Claims, 7 Drawing Sheets

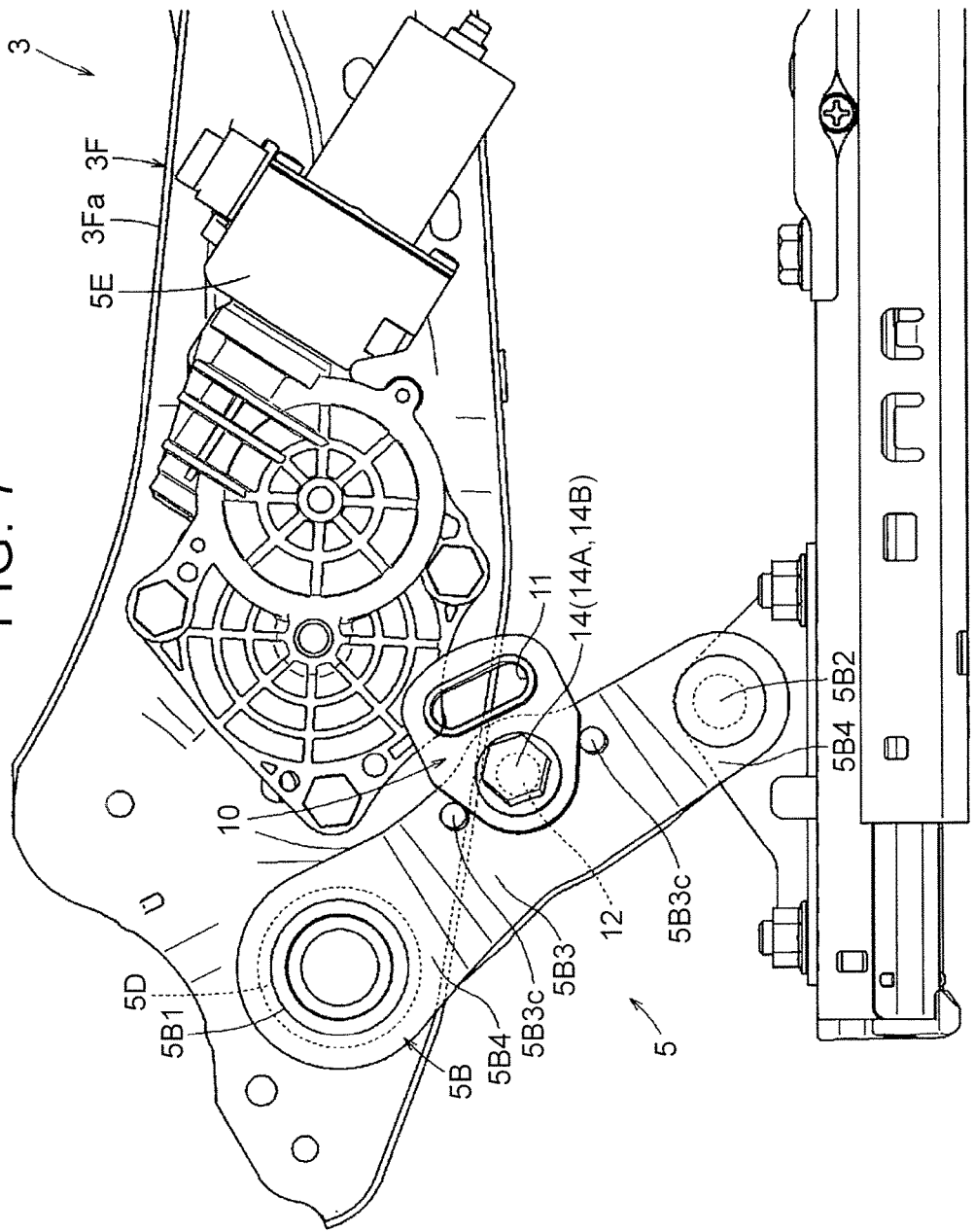

VEHICLE SEAT

INCORPORATION BY REFERENCE

The disclosure of Japanese Patent Application No. 2015-216743 filed on Nov. 4, 2015 including the specification, drawings and abstract is incorporated herein by reference in its entirety.

BACKGROUND OF THE INVENTION

1. Field of the Invention

The present invention relates to a vehicle seat. More specifically, the present invention relates to a vehicle seat including a seat lifter configured to adjust a height of a seat cushion with respect to a vehicle body.

2. Description of Related Art

In terms of a vehicle seat, there has been disclosed a configuration in which a lap anchor of a seat belt is attached to a bracket serving as a connection portion between a seat cushion and a slide rail (Japanese Patent Application Publication No. 7-108860 (JP 7-108860 A)). With such a configuration, the lap anchor moves, following a slide operation of the vehicle seat, so a tension of the seat belt is maintained to be constant even if the vehicle seat slides.

SUMMARY OF THE INVENTION

However, in the above technique, in a case where the vehicle seat is equipped with a seat lifter, the lap anchor on the slide rail cannot follow this movement, which may increase the tension of the seat belt due to lift-up of the vehicle seat. The present invention provides a vehicle seat that can cause a fixture of a seat belt to follow a movement of a seat lifter appropriately.

A vehicle seat according to an aspect of the present invention includes: a seat cushion; a base provided on a vehicle body; a seat lifter configured to adjust a height of the seat cushion by a rotational motion of a link connecting the seat cushion to the base; and a fixture of a seat belt, the fixture being attached to the link.

According to the above aspect, the fixture of the seat belt can be moved following the adjustment of the height of the seat cushion along with the rotational motion of the link.

In the above aspect, the link may be connected to an outer portion of a side frame of the seat cushion, and the fixture may be attached to an outer portion of the link.

According to the above configuration, the fixture of the seat belt can be attached to the link so as not to interfere with the side frame of the seat cushion. This accordingly makes it possible to prevent the rotational motion of the link from being disturbed.

In the above aspect, the fixture may be put on an attachment face portion so as to be attached to the attachment face portion, the attachment face portion being formed in the link such that a surface of the attachment face portion faces toward a diagonally upper side.

According to the above configuration, the attachment face portion to which the fixture is to be attached is provided so as to face the diagonally upper side, so that an attachment direction of the fixture to the attachment face portion is converted to an upper side. Accordingly, even in a configuration in which an attachment space from a lateral side is small, it is still possible to expand the attachment space so as to be opened upward.

In the above configuration, the attachment face portion may be formed so as to partially project outward from the link.

According to the above configuration, the attachment face portion of the link, to which the fixture is attached, partially projects outward, so it is difficult for the fixture to interfere with the other parts of the link at the time of the attachment of the fixture. This accordingly makes it possible to more easily attach the fixture to the link.

In the above aspect, the fixture may be attached to an intermediate part of the link in a link length direction.

According to the above configuration, in comparison with a configuration in which the fixture is attached to a connecting end portion of the link with another member, it is possible to secure a wide space in which the fixture can be attached to the link.

In the above aspect, the fixture may be attached to the link in a state where a swing rotation is restricted.

According to the above configuration, it is possible to restrict a disposition direction of the seat belt extending from the fixture within a given range.

In the above configuration, the fixture may be integrally attached to the link by a fastening structure inserted into the fixture and the link in a penetrating manner in a state where a projection portion formed in the fixture is fitted into a recessed portion formed in the link.

According to the above configuration, it is possible to firmly and integrally attach the fixture to the link without welding.

In the above configuration, the link may be provided with protrusions abutting with the fixture from both sides in a rotation direction.

According to the above configuration, it is possible to attach the fixture to the link in a state where the swing rotation is restricted.

In the above aspect, the seat lifter may include four-joint link mechanisms configured to connect the seat cushion to the base by a pair of right and left front-side links and a pair of right and left rear-side links, and a drive unit configured to transmit a turning force and a brake force to any of the links constituting the four-joint link mechanisms, and the link to which the fixture is attached may receive a brake force transmitted from the drive unit.

According to the above configuration, when a large load that causes a strong body pressure of a sitting occupant is input into a seat belt, it is possible to stably receive the load at a fixed position without rotating, due to this load input, the link to which the fixture is attached.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is an essential-part side view illustrating a schematic configuration of a vehicle seat of Embodiment 2 in a state corresponding to FIG. 5.

DETAILED DESCRIPTION OF EMBODIMENTS

Embodiments to perform the invention will be described below with reference to the drawings.

Figure 1:
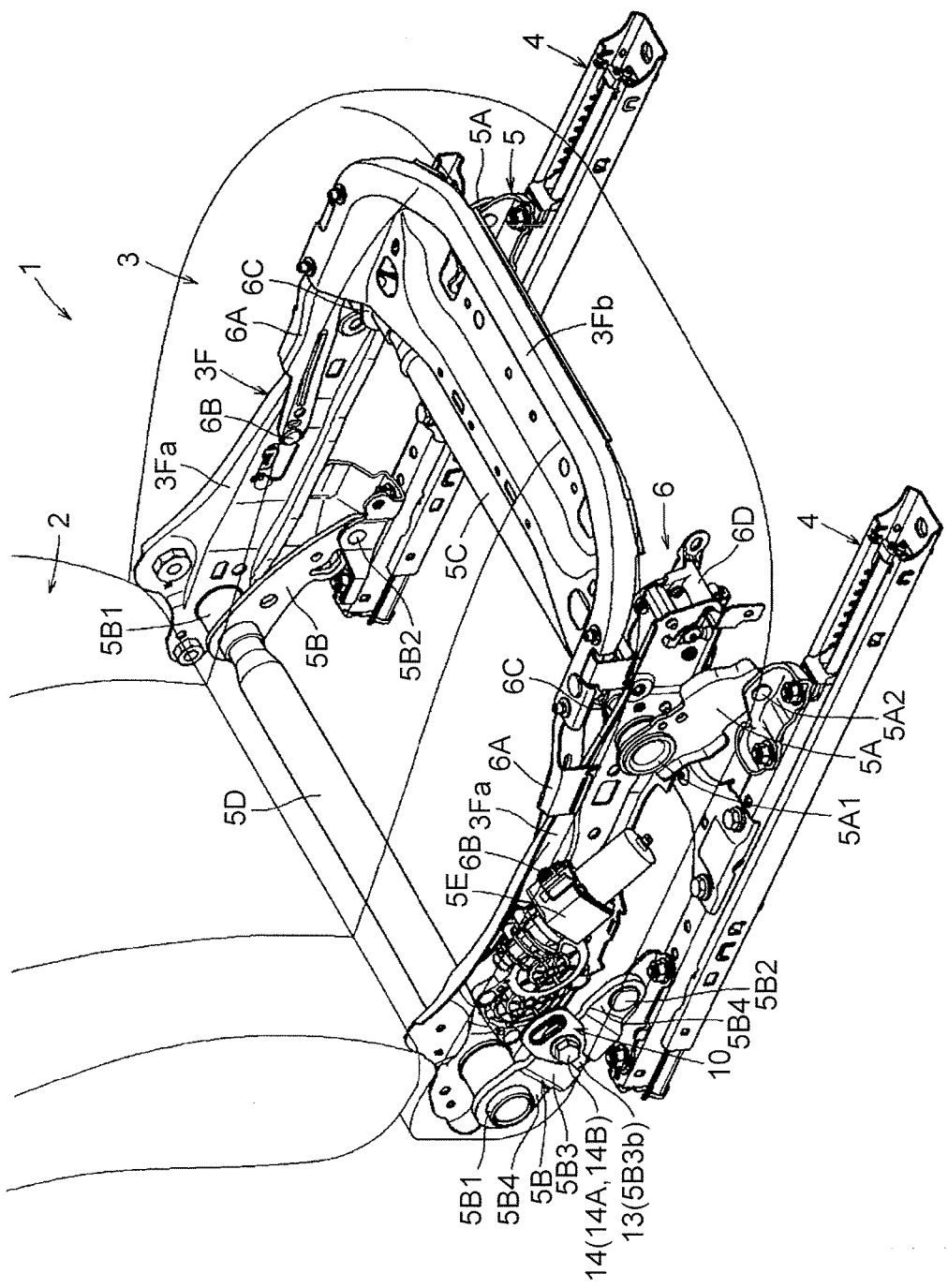
FIG. 1 is a perspective view illustrating a schematic configuration of a vehicle seat according to Embodiment 1.

Initially described is a configuration of a seat 1 (a vehicle seat) of Embodiment 1 with reference to FIGS. 1 to 6. The seat 1 of the present embodiment is provided as a right seat of an automobile, and includes a seatback 2 serving as a backrest for a sitting occupant, and a seat cushion 3 serving as a seat portion, as illustrated in FIG. 1. The seat 1 has a configuration of a so-called "power seat," and configured to perform adjustment of a backrest angle of the seatback 2 and adjustment of a sitting position of the seat cushion 3 by a motor operation of a switch.

More specifically, the seatback 2 is configured such that lower ends of right and left sides thereof are connected to rear ends of right and left sides of the seat cushion 3 via electrically-driven recliners (not shown), respectively. This maintains the seatback 2 in a state where the backrest angle is regularly fixed by the respective recliners (not shown), and when the respective recliners are electrically operated by operating a switch (not shown), the backrest angle is adjusted in a front-rear direction.

Further, the seat cushion 3 is connected onto a floor of a vehicle via a pair of right and left electrically-driven slide rails 4. Hereby, the seat cushion 3 is regularly maintained in a state where its sitting position is fixed by the slide rails 4, and when the slide rails 4 are electrically operated by operating a switch (not shown), the sitting position is adjusted in the front-rear direction. Here, the slide rails 4 are an example of a "base" of the present invention.

Further, the seat cushion 3 is configured such that an electrically-driven seat lifter 5 is provided between the seat cushion 3 and each of the pair of right and left slide rails 4. Hereby, the seat cushion 3 is regularly maintained in a state where its sitting height position is fixed by the seat lifters 5, and when the seat lifters 5 are electrically operated by operating a switch (not shown), the sitting height position is adjusted.

Further, the seat cushion 3 includes an electrically-driven front tilt mechanism 6 provided in a front part thereof. Hereby, the seat cushion 3 is regularly maintained in a state where a support angle of the front part thereof that supports femoral regions of the sitting occupant is fixed by the front tilt mechanism 6, and when the front tilt mechanism 6 is electrically operated by operating a switch (not shown), the support angle of the front part is adjusted in a height direction.

As such, the seat 1 is configured to perform adjustment in eight directions, that is, the adjustment of the backrest angle of the seatback 2 (in two directions of front and rear directions), the adjustment of the sitting position of the seat cushion 3 (in two directions of front and rear directions and two directions of up and down directions), and the adjustment of the support angle of the front part of the seat cushion 3 (in two directions of up and down directions). These adjustment operations are performed by operating an electrically-driven switch (not shown) provided on a side part or the like on an outer side (a left side in the figure) of the seat cushion 3 in a vehicle width direction.

Figure 2:
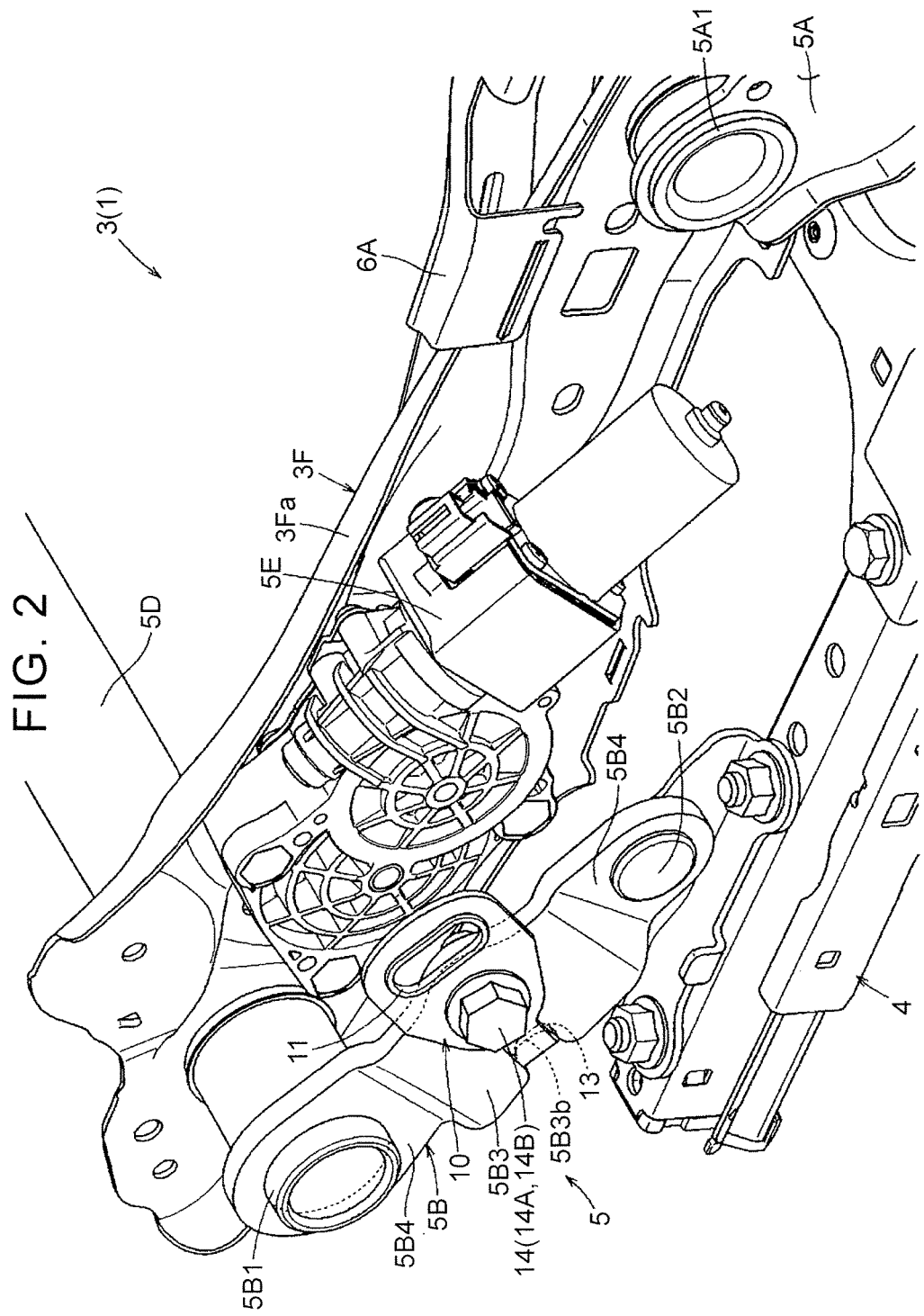
FIG. 2 is a perspective view illustrating an essential part of the vehicle seat in an enlarged manner.
Figure 4:
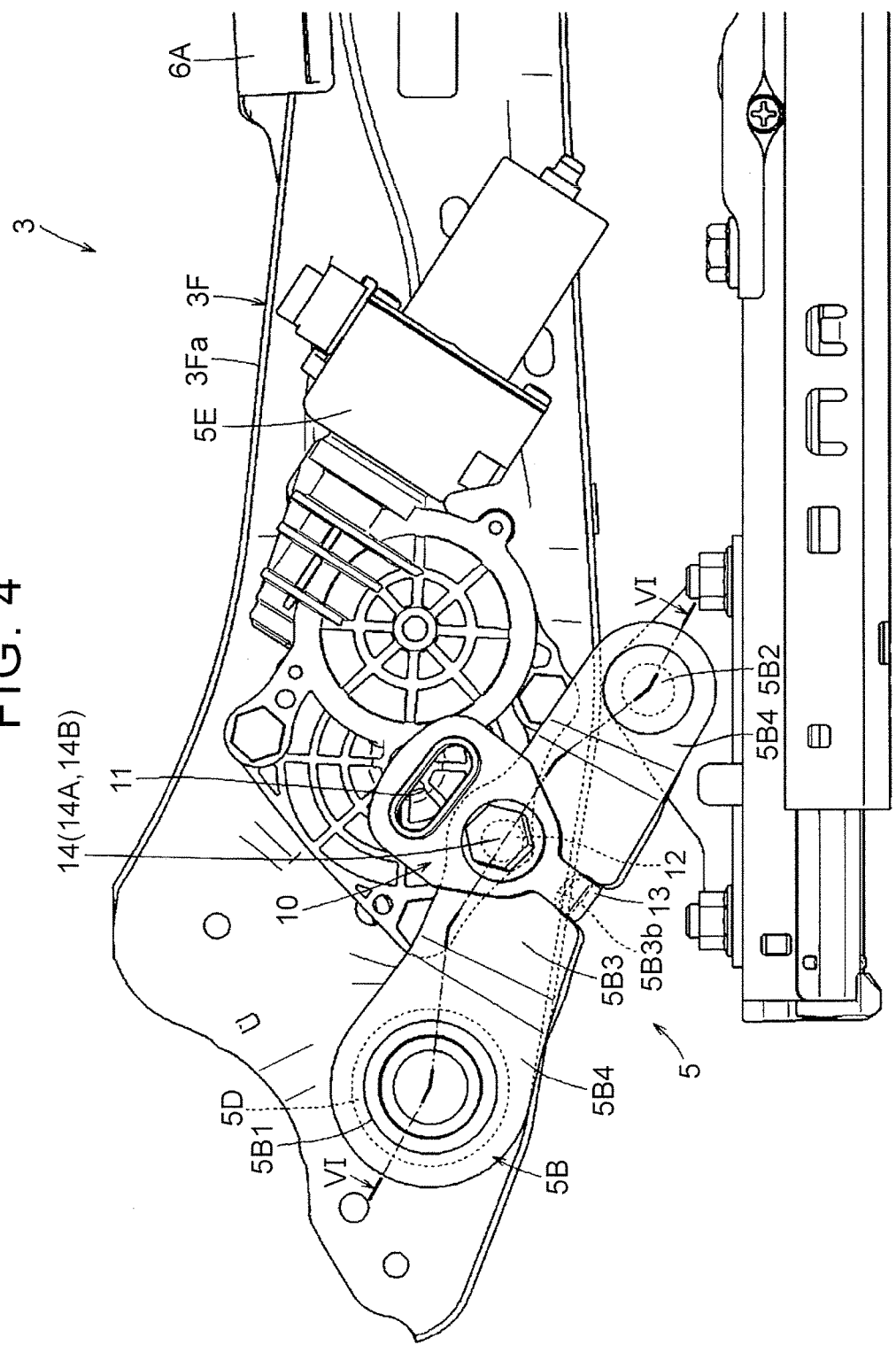
FIG. 4 is an essential-part side view illustrating a state where the seat lifter is moved down.
Figure 5:
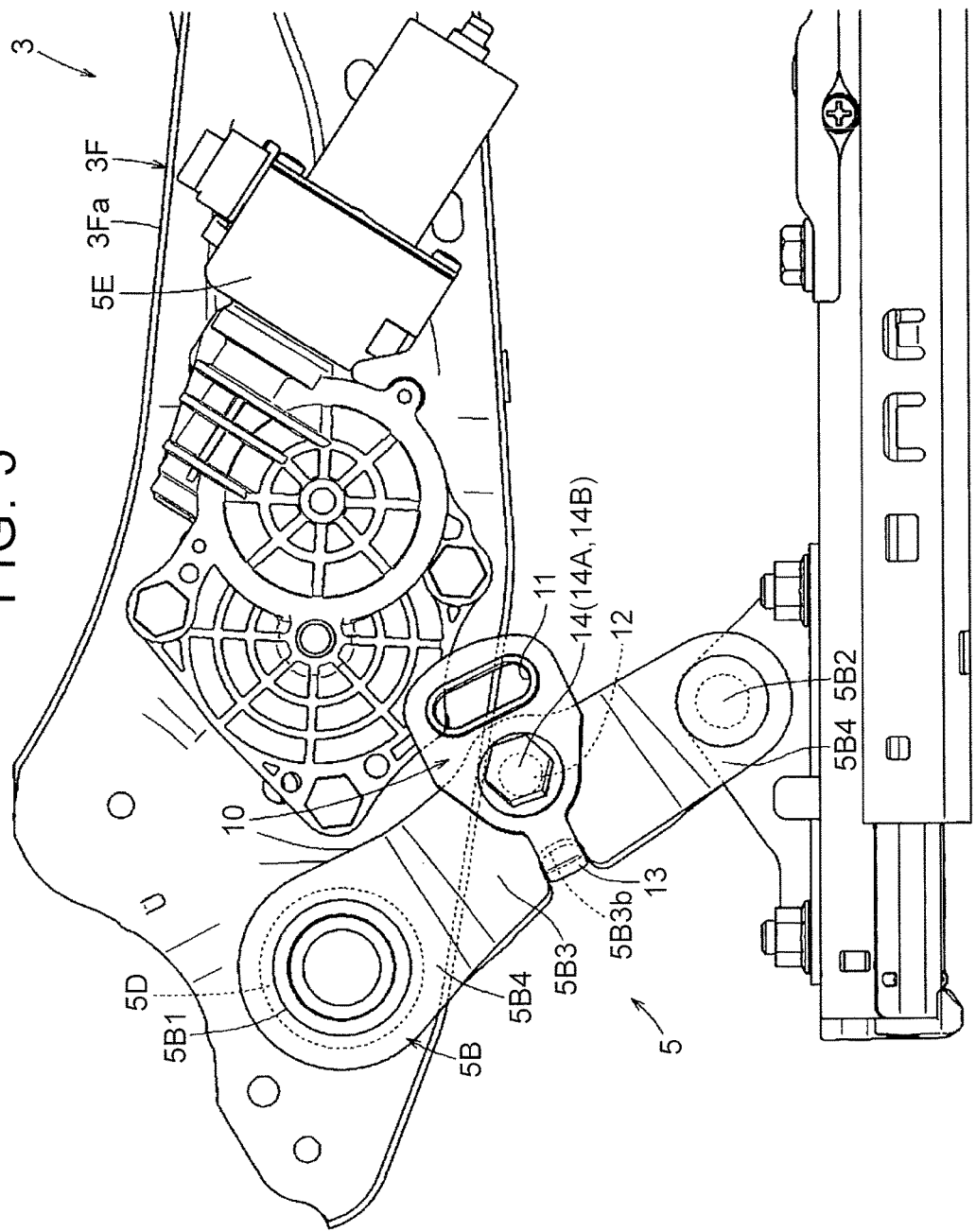
FIG. 5 is an essential-part side view illustrating a state where the seat lifter is moved up.

Further, as illustrated in FIG. 2, the seat 1 is configured such that a lap anchor 10 attached to a distal end of a belt webbing of a seat belt (not shown) is attached to a rear link 5B provided on the outer side in the vehicle width direction and constituting the seat lifter 5. Since the lap anchor 10 is attached at such a position, the lap anchor 10 is allowed to appropriately follow a movement to move up/down the sitting height of the seat cushion 3 by rotating the rear link 5B of the seat lifter 5 as illustrated in FIGS. 4, 5. Here, the rear link 5B on the outer side in the vehicle width direction is an example of a "link" of the present invention.

Since the lap anchor 10 moves following the rotational motion of the rear link 5B, even if the sitting height of the seat cushion 3 is moved up/down, a position of the lap anchor 10 with respect to the seat cushion 3 does not easily change. Accordingly, it is possible to regularly maintain a constant state without tightening or loosening a tension of the seat belt according to the movement of the seat lifter 5 to be moved up/down.

Further, as illustrated in FIGS. 1, 2, the rear link 5B which is provided on the outer side in the vehicle width direction and to which the lap anchor 10 is attached is connected to a drive unit 5E configured to output a rotational driving force and a brake force to move up/down the seat lifter 5. With such a configuration, the rear link 5B on the outer side in the vehicle width direction is configured to receive a power transmitted from the drive unit 5E, so that the rear link 5B is rotated or stops rotating. Since the lap anchor 10 is attached to the rear link 5B that receives a brake force transmitted from the drive unit 5E, when a large load that causes a strong body pressure of the sitting occupant due to a front collision or the like of the vehicle is input into the seat belt, it is possible to receive the load stably at a fixed position without rotating, due to this load input, the rear link 5B to which the lap anchor 10 is attached.

Note that, when the lap anchor 10 is attached at such a position, the lap anchor 10 can move following an operation of the slide rails 4 at the time when the seat cushion 3 moves forward or backward by the operation of the slide rails 4. Accordingly, it is possible to regularly maintain a constant state without tightening or loosening the tension of the seat belt according to the movement of the slide rails 4.

Further, a buckle equipped with a tongue plate passed through the belt webbing of the seat belt (not shown) is also provided in the seat 1 is a state where the buckle is attached onto the slide rail 4 provided on an inner side in the vehicle width direction. Hereby, the buckle (not shown) is also movable following the movement of the slide rails 4. Accordingly, with the configuration in which both the buckle (not shown) and the lap anchor 10 follow the movement of the slide rails 4, it is possible to regularly maintain a constant state without tightening or loosening the tension of the seat belt even if the slide rails 4 are moved.

The following describes a specific attachment structure of the rear link 5B on the outer side of the lap anchor 10 in the vehicle width direction, as well as a concrete configuration of the seat cushion 3. First, the configuration of the seat cushion 3 is described. As illustrated in FIG. 1, the seat cushion 3 is configured such that a metal cushion frame 3F forming its framework is assembled in a square frame shape in a plan view along an outer circumferential shape of the seat cushion 3.

More specifically, the cushion frame 3F includes: a pair of right and left side frames 3Fa; and a front panel 3Fb provided between front ends of respective side frames 3Fa so as to support the femoral regions of the sitting occupant from a lower side. A front pipe 5C and a rear pipe 5D each made of a metal circular pipe are provided between front parts of the side frames 3Fa and between rear parts thereof, respectively, via respective bushes 5A1, 5B1 in a seat width direction. Hereby, the cushion frame 3F is assembled in a square frame shape in a plane view as a whole. A support spring (not shown) for elastically and softly supporting a cushion pad (not shown) from the lower side is provided between the front pipe 5C and the rear pipe 5D. The cushion pad is assembled to an upper part of the cushion frame 3F.

The side frame 3Fa is made of one steel sheet material cut by press-cutting in a plate shape elongated in the front-rear direction. The side frame 3Fa is provided in a standing manner such that its surface faces the seat width direction, and is configured such that an upper edge portion and a lower edge portion are bent toward a seat outer side. Hereby, its structural strength to bending and twisting is enhanced.

The front panel 3Fb is made of one steel sheet material cut by press-cutting in a plate shape elongated in the seat width direction. The front panel 3Fb is set to be provided between front end portions of respective side frames 3Fa such that its surface faces a height direction from a seat upper side. The front panel 3Fb is provided in such a state where tilt arms 6A connected to both right and left parts of the front panel 3Fb and extending rearward are provided on inner parts of respective side frames 3Fa such that the tilt arms 6A are rotatably shaft-connected by respective rotating shafts 6B placed at positions on the same axis and facing the seat width direction. Hereby, the front panel 3Fb is configured such that an angle of an upper face portion thereof that supports the femoral regions of the sitting occupant can be changed by rotating around the rotating shafts 6B in the height direction.

The seat lifter 5 is constituted by a pair of right and left four-joint link mechanisms including: a pair of right and left front links 5A; a pair of right and left rear links 5B; and the drive unit 5E configured to transmit a rotational driving force and a brake force for a moving-up/down operation to the rear link 5B provided on the outer side in the vehicle width direction.

The front links 5A are placed at offset and asymmetric right and left positions on the outer sides in the vehicle width direction relative to respective side frames 3Fa. An upper end of the front link 5A is assembled to its corresponding side frame 3Fa via a cylindrical bush 5A1 in a state where the upper end is rotatably shaft-connected thereto, and a lower end thereof is assembled to an upper part of its corresponding slide rail 4 via a connecting shaft 5A2 in a state where the lower end is rotatably shaft-connected thereto. The front pipe 5C having a stepped circular-tube shape so as to be reduced in diameter such that both ends of the front pipe 5C are fitted inside cylindrical shapes of the bushes 5A1 is assembled between the bushes 5A1 in a state where the front pipe 5C is inserted into the bushes 5A1 from the inner side in the seat width direction and rotatably shaft-connected thereto.

The rear links 5B are also placed at offset and asymmetric right and left positions on the outer sides in the vehicle width direction relative to respective side frames 3Fa. An upper end of the rear link 5B is assembled to its corresponding side frame 3Fa via a cylindrical bush 5B1 in a state where the upper end is rotatably shaft-connected thereto, and a lower end thereof is assembled to an upper part of its corresponding slide rail 4 via a connecting shaft 5B2 in a state where the lower end is rotatably shaft-connected thereto. The rear pipe 5D having a stepped circular-tube shape so as to be reduced in diameter such that both ends of the rear pipe 5D are fitted into cylindrical shapes of the bushes 5B1 is assembled between the bushes 5B1 in a state where the rear pipe 5D is inserted into the bushes 5B1 from the inner side in the seat width direction and connected integrally therewith. By the assembling, the rear links 5B can pivot integrally via the rear pipe 5D, and hereby, structural strength thereof to bending and twisting is enhanced.

The drive unit 5E is connected, via the bush 5B1, to the rear link 5B placed on the outer side in the vehicle width direction. The drive unit 5E is configured to transmit a rotational driving force and a brake force to the rear link 5B. A main structure of the drive unit 5E is attached to an outer part of the side frame 3Fa provided on the outer side in the vehicle width direction. The main structure is, for example, a drive motor or the like of the drive unit 5E. The drive unit 5E is configured such that the main structure is connected, in a power transmittable manner, to the bush 5B 1 integrally connected to the rear link 5B on the outer side in the vehicle width direction, at an inner position of the side frame 3Fa via a connecting structure of a gear (not shown). Hereby, a rotational driving force output from the drive unit 5E is transmitted to the rear link 5B on the outer side in the vehicle width direction.

The seat lifter 5 is operated such that, when the drive unit 5E is driven by operating a switch (not shown), its turning force is transmitted to the rear link 5B on the outer side in the vehicle width direction, so that the rear links 5B and the front links 5A on both sides are operated in a linking manner by a rotational motion at one degree of freedom. Further, when the operation of the switch (not shown) is not performed, the seat lifter 5 is maintained in a state where the movements of the rear links 5B and the front links 5A on both sides are stopped all at once due to a brake force exerted by the drive unit 5E.

The front tilt mechanism 6 includes: the tilt arms 6A connected to the right and left parts of the front panel 3Fb so as to extend rearward; the rotating shafts 6B shaft-connecting respective rear ends of the tilt arms 6A to respective side frames 3Fa in a rotatable manner; a pair of right and left bendable/stretchable links 6C each connected in a linking manner between the front panel 3Fb and the front pipe 5C; and a drive unit 6D configured to transmit a rotational driving force and a brake force for a bending/stretching operation to the bendable/stretchable link 6C provided on the outer side in the vehicle width direction.

A detailed illustration of the bendable/stretchable links 6C is omitted, but the front pipe 5C is inserted into base end portions of the bendable/stretchable links 6C and connected thereto so that the bendable/stretchable links 6C are rotatable integrally via the front pipe 5C. The drive unit 6D is attached and connected to the side frame 3Fa on the outer side in the vehicle width direction, so that the drive unit 6D can transmit a rotational driving force and a brake force to the bendable/stretchable link 6C provided on the same side.

The front tilt mechanism 6 is operated such that, when the drive unit 6D is driven by operating a switch (not shown), its rotational driving force is transmitted to the bendable/stretchable link 6C on the outer side in the vehicle width direction, so that the bendable/stretchable links 6C on both sides perform a bending/stretching operation all at once. By the bending/stretching operation of the bendable/stretchable links 6C, the front tilt mechanism 6 moves up/down the front panel 3Fb around the rotating shafts 6B relative to the front pipe 5C. Further, when the operation of the switch (not shown) is not performed, the front tilt mechanism 6 is maintained in a state where the movements of the bendable/stretchable links 6C on both sides are stopped all at once by a brake force exerted by the drive unit 6D.

Figure 3:
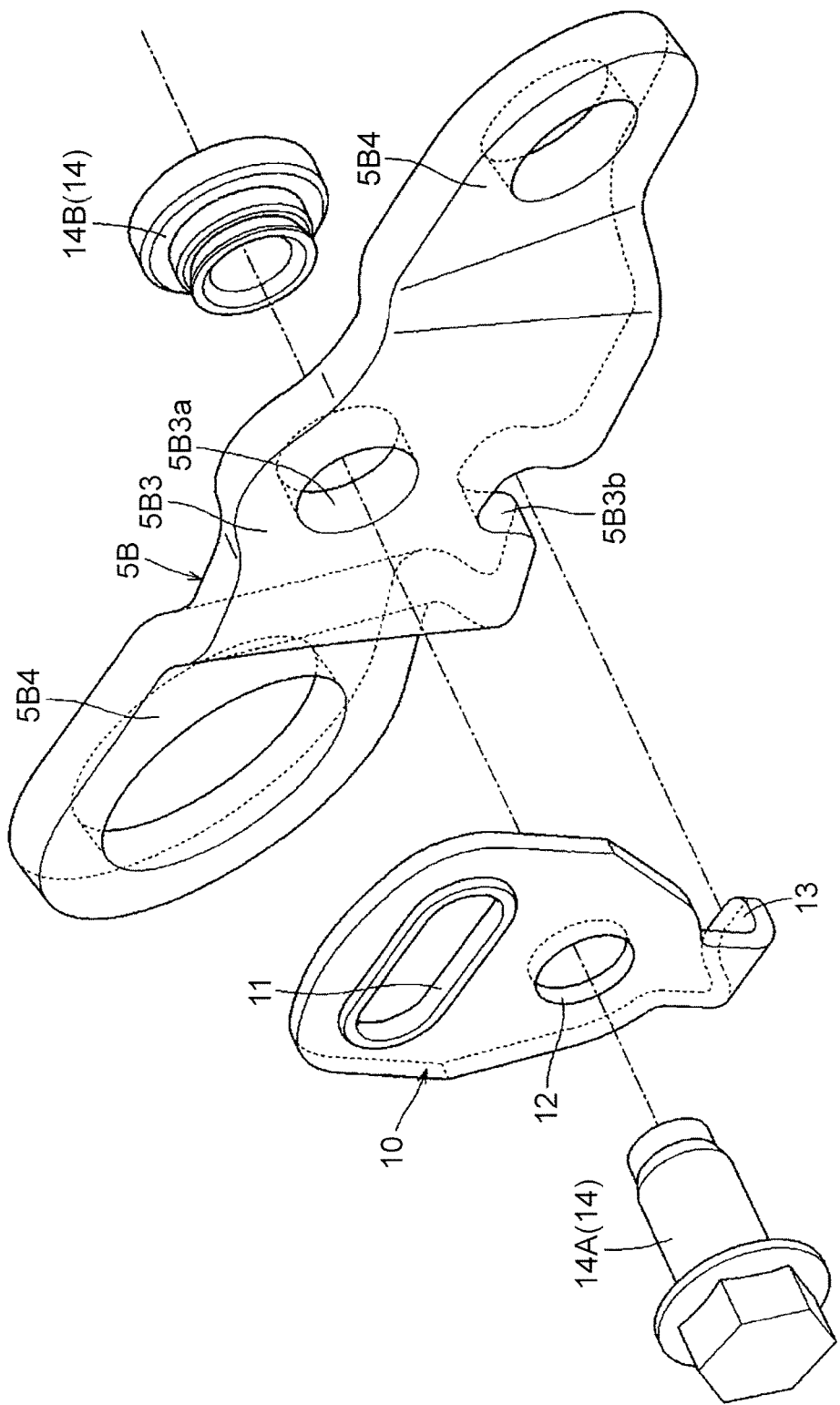
FIG. 3 is an exploded perspective view of a link and a fixture.
Figure 6:
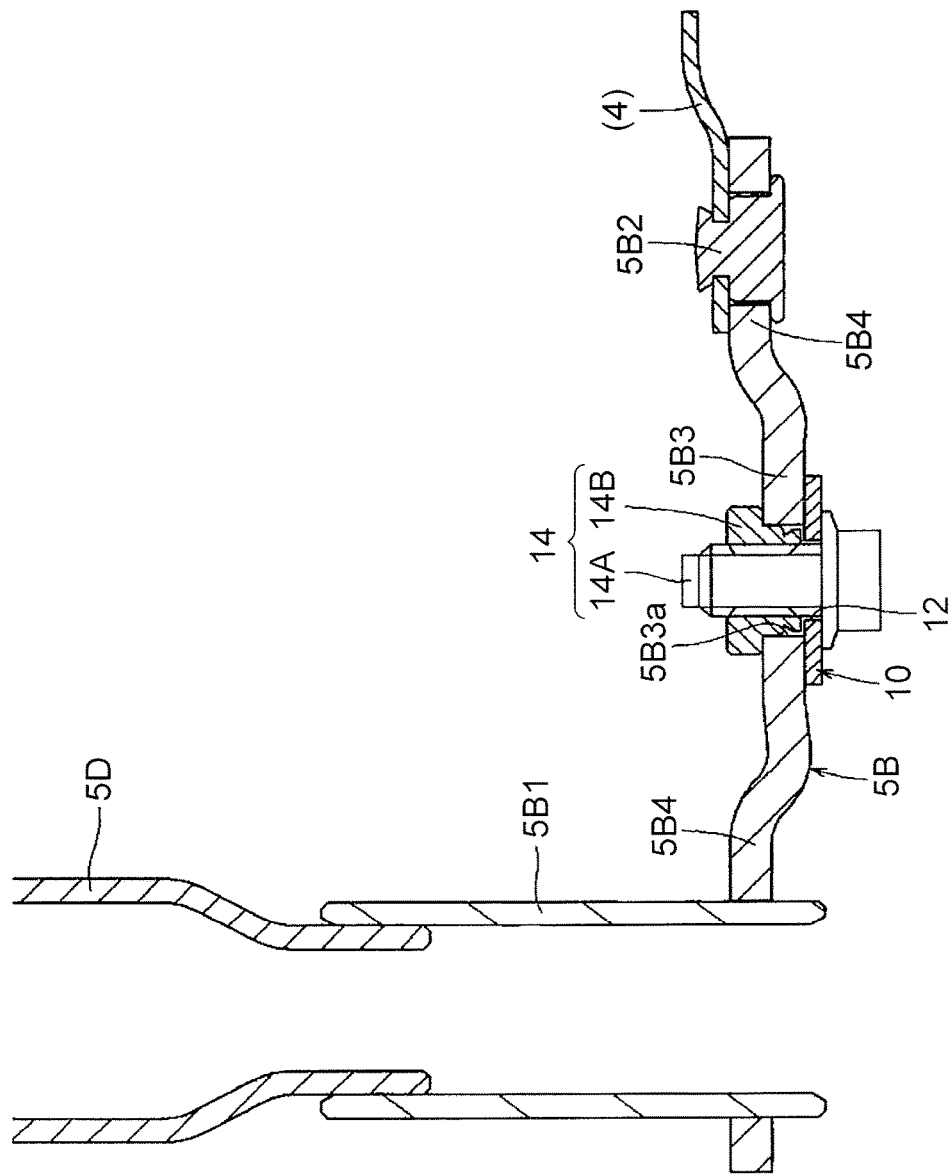
FIG. 6 is a sectional view taken along a line VI-VI in FIG. 4.

Next will be described an attachment structure of the lap anchor 10 to the rear link 5B on the outer side in the vehicle width direction. As illustrated in FIGS. 2, 3, the lap anchor 10 is made of one steel sheet material cut by press-cutting generally in a plate shape. As illustrated in FIGS. 3 and 6, after the lap anchor 10 is set in a state where the lap anchor 10 makes surface contact with an attachment face portion 5B3 formed generally in a central part, in a link length direction, of the rear link 5B on the outer side in the vehicle width direction from outside in the seat width direction, the lap anchor 10 is fastened to the attachment face portion 5B3 of the rear link 5B by an insertion-type fastening structure 14 constituted by a bolt 14A and a nut 14B inserted into the lap anchor 10 and the attachment face portion 5B3 in a penetrating manner. Hereby, the lap anchor 10 is integrally attached to the attachment face portion 5B3.

More specifically, the attachment face portion 5B3 of the rear link 5B is formed such that a generally central part of the rear link 5B in the link length direction is bent relative to both end parts 5B4 of the rear link 5B, so as to be partially extruded outward in the seat width direction. More specifically, the attachment face portion 5B3 has a shape bent so as to be extruded diagonally relative to both end parts 5B4 so that its outer surface thus extruded in the seat width direction faces a diagonally seat upper side. Surfaces of the both end parts 5B4 face straight in the seat width direction.

With the above configuration, the rear link 5B is provided in a shape in which a surface thereof faces the diagonally seat upper side at a position where the attachment face portion 5B3 to which the lap anchor 10 is attached projects outward relative to the other parts (both end parts 5B4) of the rear link 5B. Accordingly, at the time of attaching the lap anchor 10 to the rear link 5B configured as described above, even in a state where the seat 1 is first assembled onto the floor of the vehicle as illustrated in FIG. 2 and a space in the vehicle width direction between the rear link 5B and fixings (B-pillar and the like; not shown) of the vehicle, externally adjacent thereto, is narrowed, an attachment direction of the lap anchor 10 relative to the attachment face portion 5B3 is converted to an upper side, so that a workspace for the attachment is expanded so as to be opened upward. This is because the attachment face portion 5B3 of the rear link 5B is disposed so as to face a diagonally upper side. The attachment face portion 5B3 of the rear link 5B is a part to which the lap anchor 10 is to be attached.

The attachment face portion 5B3 of the rear link 5B has a round insertion hole 5B3a into which a shaft portion of the after-mentioned bolt 14A is inserted, and a square catch hole 5B3b on which a hook portion 13 of the after-mentioned lap anchor 10 is hooked. The insertion hole 5B3a is formed generally in a central part of the attachment face portion 5B3 in a penetrating manner, and the catch hole 5B3b is formed in an edge thereof in a penetrating manner. The catch hole 5B3b is formed in a shape having a hole width that allows the hook portion 13 of the after-mentioned lap anchor 10 to be fitted therein by hooking the hook portion 13 inside the catch hole 5B3b, thereby preventing lateral displacement of the hook portion 13 in the link length direction of the rear link 5B. Here, the catch hole 5B3b is an example of a "recessed portion" of the present invention, and the hook portion 13 of the after-mentioned lap anchor 10, hooked on the catch hole 5B3b, is an example of a "projection portion" of the present invention.

In the meantime, as illustrated in FIG. 3, the lap anchor 10 is made of a steel sheet material cut by press-cutting generally in a generally pentagonal plate shape. The lap anchor 10 is formed in a shape having: an elongated through-hole 11 through which a distal portion of the belt webbing of the seat belt (not shown) is passed so as to be attached thereto; a round insertion hole 12 to which a shaft portion of the after-mentioned bolt 14A is inserted; and hook portion 13 bent in a hook shape to be hooked inside the catch hole 5B3b of the rear link 5B described above.

The through-hole 11 described above is formed in a long hole shape along an edge portion of one side of the lap anchor 10 in a penetrating manner. An inner peripheral portion of the through-hole 11 is coated with a resin film so as to prevent wearing of the belt webbing passed through the through-hole 11. The insertion hole 12 is formed so as to penetrate through a generally central part of the lap anchor 10. More specifically, as illustrated in FIGS. 4, 5, the insertion hole 12 is formed at a position on a perpendicular bisector of the through-hole 11 in a region on an opposite side (a rear lower side) of the through-hole 11 to a side (a front upper side) where the belt webbing extends.

Further, as illustrated in FIG. 3, the hook portion 13 is formed so as to be bent perpendicularly from a corner part extended in a tapered shape on an opposite side of the lap anchor 10 to a side where the through-hole 11 is formed. More specifically, as illustrated in FIGS. 4, 5, the hook portion 13 is formed side by side with the aforementioned insertion hole 12 at the position on the perpendicular bisector of the through-hole 11 in the region on the opposite side (the rear lower side) of the through-hole 11 to the side (the front upper side) where the belt webbing (not shown) extends.

As illustrated in FIG. 3, the lap anchor 10 configured as described above is attached to the attachment face portion 5B3 of the aforementioned rear link 5B from outside as follows. First, the lap anchor 10 is placed closer to the attachment face portion 5B3 of the rear link 5B such that their respective plate shapes make surface contact with each other. Then, the hook portion 13 is fitted into the catch hole 5B3b and the insertion holes 12, 5B3a are set to be aligned with each other. Subsequently, the shaft portion of the bolt 14A is inserted from outside into the insertion holes 12, 5B3a thus aligned with each other, and is fastened with the nut 14B from the other side. Hereby, the lap anchor 10 is brought into surface contact with the attachment face portion 5B3 of the rear link 5B in an axial direction (a plate-thickness direction), so that they are firmly and integrally fastened to each other. More specifically, since the hook portion 13 is configured to be hooked and fitted to the catch hole 5B3b, the lap anchor 10 is firmly and integrally fastened to the attachment face portion 5B3 of the rear link 5B in a state where a rotational movement around the shaft portion of the bolt 14A is stopped.

As illustrated in FIGS. 4, 5, the lap anchor 10 is attached to the attachment face portion 5B3 of the rear link 5B as described above, so that the lap anchor 10 is assembled in a state where the through-hole 11 through which the belt webbing (not shown) is passed projects from the attachment face portion 5B3 of the rear link 5B in a direction (the front upper side) where the belt webbing extends. Hereby, the belt webbing passed through the through-hole 11 of the lap anchor 10 is provided so as not to interfere with the rear link 5B.

As illustrated in FIGS. 4, 5, in the lap anchor 10 attached to the attachment face portion 5B3 of the rear link 5B as described above, a movable range of the rear link 5B along with the moving-up/down operation of the seat lifter 5 is within a range where a back posture is maintained. Accordingly, the through-hole 11 through which the belt webbing (not shown) is passed is regularly maintained in a state where the through-hole 11 projects from the attachment face portion 5B3 of the rear link 5B in the direction (the front upper side) where the belt webbing extends. At the time when the lap anchor 10 receives an input of a large load from the belt webbing (not shown) passed through the through-hole 11 along with a front collision or the like of the vehicle, the lap anchor 10 strongly receives the load due to a support by the rear link 5B to which the lap anchor 10 is attached.

More specifically, the lap anchor 10 can strongly receive, relatively straight from the rear lower side, an interaction of a tensile force transmitted to an inner peripheral portion of the through-hole 11 from the belt webbing (not shown), due to the insertion-type fastening structure 14 (the fastening structure by the bolt 14A and the nut 14B) placed on a back side (the rear lower side) relative to the through-hole 11 and a catch structure of the hook portion 13 with respect to the catch hole 5B3b. Further, the rear link 5B that supports the lap anchor 10 is connected to the drive unit 5E configured to transmit a rotational driving force for a moving-up/down operation and a brake force to the rear link 5B. This makes it possible to strongly receive the interaction of the tensile force received from the belt webbing, by a brake force exerted by the drive unit 5E.

When the above description is summarized, the seat 1 of the present embodiment has the following configuration. That is, the seat 1 of the present embodiment is a vehicle seat (the seat 1) including the seat lifter 5 configured to adjust a height of the seat cushion 3 with respect to the vehicle body (the floor). The seat lifter 5 is configured to adjust the height of the seat cushion 3 by a rotational motion of a link (the rear link 5B on the outer side in the vehicle width direction) that connects the seat cushion 3 to a base (the slide rail 4) on the vehicle body (the floor). A fixture (the lap anchor 10) of the seat belt is attached to the link (the rear link 5B on the outer side in the vehicle width direction). With such a configuration, the fixture (the lap anchor 10) of the seat belt can be moved following the adjustment of the height of the seat cushion 3 along with a rotational motion of the link (the rear link 5B on the outer side in the vehicle width direction).

Further, the link (the rear link 5B on the outer side in the vehicle width direction) is connected to the outer portion of the side frame 3Fa of the seat cushion 3, and the fixture (the lap anchor 10) is attached to the outer portion of the link (the rear link 5B on the outer side in the vehicle width direction). With such a configuration, the fixture (the lap anchor 10) of the seat belt can be attached to the link (the rear link 5B on the outer side in the vehicle width direction) so as not to interfere with the side frame 3Fa of the seat cushion 3. This accordingly makes it possible to prevent the rotational motion of the link (the rear link 5B on the outer side in the vehicle width direction) from being disturbed.

Further, the fixture (the lap anchor 10) is configured to be put on the attachment face portion 5B3 so as to be attached thereto. The attachment face portion 5B3 is formed in the link (the rear link 5B on the outer side in the vehicle width direction) such that its surface faces the diagonally upper side. Since the attachment face portion 5B3 to which the fixture (the lap anchor 10) is to be attached is provided so as to face the diagonally upper side as such, an attachment direction of the fixture (the lap anchor 10) to the attachment face portion 5B3 is converted to an upper side. Accordingly, even in a configuration in which an attachment space from a lateral side is small, it is possible to expand the attachment space so as to be opened upward.

Further, the attachment face portion 5B3 is formed so as to partially project outward from the link (the rear link 5B on the outer side in the vehicle width direction). Since the attachment face portion 5B3 to which the fixture (the lap anchor 10) of the link (the rear link 5B on the outer side in the vehicle width direction) is attached is configured so as to partially project outward, it becomes hard for the fixture (the lap anchor 10) to interfere with the other parts (both end parts 5B4 and the like) of the link (the rear link 5B on the outer side in the vehicle width direction) at the time of the attachment of the fixture (the lap anchor 10). Accordingly, the fixture (the lap anchor 10) can be more easily attached to the link (the rear link 5B on the outer side in the vehicle width direction).

Further, the fixture (the lap anchor 10) is attached to an intermediate part (the attachment face portion 5B3), in the link length direction, of the link (the rear link 5B on the outer side in the vehicle width direction). With such a configuration, it is possible to secure a wide space in which the fixture (the lap anchor 10) can be attached to the link (the rear link 5B on the outer side in the vehicle width direction), in comparison with a configuration in which the fixture (the lap anchor 10) is attached to a connection end portion (both end parts 5B4) of the link (the rear link 5B on the outer side in the vehicle width direction) with respect to another member.

Further, the fixture (the lap anchor 10) is attached to the link (the rear link 5B on the outer side in the vehicle width direction) in a state where a swing rotation around the shaft of the bolt 14A is restricted. With such a configuration, it is possible to restrict a disposition direction of the seat belt extending from the fixture (the lap anchor 10) within a given range.

More specifically, in a state where a projection portion (the hook portion 13) formed in the fixture (the lap anchor 10) is fitted to a recessed portion (the catch hole 5B3b) formed in the link (the rear link 5B on the outer side in the vehicle width direction), the fixture (the lap anchor 10) is integrally attached to the link (the rear link 5B on the outer side in the vehicle width direction) by the fastening structure 14 inserted into the fixture (the lap anchor 10) and the link (the rear link 5B on the outer side in the vehicle width direction) in a penetrating manner. With such a configuration, the fixture (the lap anchor 10) can be firmly and integrally attached to the link (the rear link 5B on the outer side in the vehicle width direction) without welding.

Note that the restriction on the swing rotation of the lap anchor 10 by the fitting between the projection portion (the hook portion 13) and the recessed portion (the catch hole 5B3b) may be performed by forming the recessed portion (the catch hole 5B3b) with a width wider than the projection portion (the hook portion 13) in a rotation direction, so as to permit the swing rotation of the lap anchor 10 within a given range.

Further, the seat lifter 5 includes: the four-joint link mechanisms in which the seat cushion 3 is connected to the base by a pair of right and left front-side links (the front links 5A) and a pair of right and left rear-side links (the rear links 5B); and the drive unit 5E configured to transmit a turning force and a brake force to any link (the rear link 5B on the outer side in the vehicle width direction) among the links constituting the four-joint link mechanisms. The link (the rear link 5B on the outer side in the vehicle width direction) to which the fixture (the lap anchor 10) is attached is configured to receive a brake force transmitted from the drive unit 5E. With such a configuration, when a large load that causes a strong body pressure of the sitting occupant is input into the seat belt, it is possible to stably receive the load at a fixed position without rotating, due to this load input, the link (the rear link 5B on the outer side in the vehicle width direction) to which the fixture (the lap anchor 10) is attached.

Next will be described a configuration of a seat 1 (a vehicle seat) of Embodiment 2 with reference to FIG. 7. In the present embodiment, an attachment face portion 5B3 (an intermediate part in a link length direction) of a rear link 5B (a link) on the outer side in the vehicle width direction is provided with protrusions 5B3c in a projecting manner such that the protrusions 5B3c abut with a lap anchor 10 (a fixture) attached to the attachment face portion 5B3, from both sides in a rotation direction. With a configuration in which the protrusions 5B3c abut with the lap anchor 10 from both sides in the rotation direction, the lap anchor 10 is integrally attached to the rear link 5B in a state where a swing rotation around a shaft of a bolt 14A is restricted.

Note that the restriction on the swing rotation of the lap anchor 10 by the protrusions 5B3c may be performed with gaps between the lap anchor 10 and respective protrusions 5B3c in the rotation direction, so as to permit the swing rotation of the lap anchor 10 within a given range. Further, the protrusions 5B3c may be provided such that an extending portion is formed so as to radially extend from the lap anchor 10, like the hook portion 13 radially extending from the lap anchor 10 in Embodiment 1, so that the protrusions 5B3c abut with the extending portion from both sides in the rotation direction (including a case where the protrusions 5B3c are provided with given gaps). Further, other than the configuration in which the protrusions 5B3c have an integrated structure in which the protrusions 5B3c are formed so as to be extruded from the lap anchor 10 in the plate-thickness direction (the axial direction), the protrusions 5B3c may have a separate structure in which the protrusions 5B3c are press-fitted, caulked, or welded to the lap anchor 10 in the axial direction so as to be attached thereto. The other configurations are the same as those of the seat 1 described in Embodiment 1, so the same reference signs are assigned to them and descriptions thereof are omitted.

The embodiments of the present invention have been described above with reference to two embodiments, but the present invention can be performed in various embodiments other than the above embodiments. For example, the "vehicle seat" of the present invention is applicable to seats other than the right seat of the automobile. Further, the vehicle seat of the present invention is widely applicable to seats used in a car other than the automobile, such as a train car, and other vehicles such as an aircraft, a ship, and the like.

Further, the seat lifter may perform the adjustment of the height of the seat cushion by a link motion of a so-called pantographic link mechanism assembled in an X-shape. Further, the structure in which the fixture of the seat belt is attached to the link constituting the seat lifter is not limited to the lap anchor exemplified in the above embodiments, but may be applied to a buckle equipped with a tongue plate passed through the belt webbing. Further, like the configuration disclosed in JP 2015-067135 A, and the like, the seat lifter may be configured to be manually moved up/down by an operation to move up/down an operating lever.

Further, the fixture may not necessarily be attached to the link integrally, but may be attached in a state where the fixture is rotatably connected by a pin. Further, the fixture may be attached to the link by means such as welding or caulking, other than the insertion-type fastening structure. Further, the fixture may be a fixture attached to the link with a direct contact, or may be indirectly attached to the link via another member such as a bracket without a direct contact.

Further, the fixture may be attached to the intermediate part of the link in the link length direction, or may be attached to an end part of the link.

Further, the attachment face portion of the link, to which the fixture is attached, may not necessarily be formed such that its surface partially faces the diagonally upper side from the link, but may be formed such that the surface faces straight in the width direction like the other parts or may be formed to be flush with the other parts. Further, in a case where the attachment face portion is formed such that the surface partially faces the diagonally upper side from the link, the attachment face portion may be formed such that the surfaces faces the diagonally upper side at a position where the attachment face portion projects outward from the link, or may be formed such that the surface faces the upper side at a position where the attachment face portion is drawn inward from the link.

Further, in terms of the configuration to attach the fixture to the link, the configuration in which the projection portion formed in the fixture is fitted to the recessed portion formed in the link may be formed not in respective edges of the fixture and the link, but in respective central parts thereof. Further, the recessed portion may be formed in the fixture, and the projection portion may be formed in the link. Further, the recessed portion may not be a hole penetrating through the fixture or the like, but may be a recess.

What is claimed is:

1. A vehicle seat comprising:
   a seat cushion;
   a base provided on a vehicle body;
   a seat lifter configured to adjust a height of the seat cushion by a rotational motion of a link connecting the seat cushion to the base; and
   a fixture of a seat belt, the fixture being attached to the link, wherein
   the fixture is positioned on an attachment face portion of the link that partially projects outward from the link, the attachment face portion being configured such that a surface of the attachment face portion faces toward a diagonal upper side of the vehicle seat.

2. The vehicle seat according to claim 1, wherein:
   the link is connected to an outer portion of a side frame of the seat cushion; and
   the fixture is attached to an outer portion of the link.

3. The vehicle seat according to claim 1, wherein the fixture is attached to an intermediate part of the link in a link length direction.

4. The vehicle seat according to claim 1, wherein the fixture is attached to the link in a state where a swing rotation is restricted.

5. The vehicle seat according to claim 4, wherein the fixture is integrally attached to the link by a fastening structure inserted into the fixture and the link in a penetrating manner in a state where a projection portion formed in the fixture is fitted into a recessed portion formed in the link.

6. A vehicle seat comprising:
   a seat cushion;
   a base provided on a vehicle body;
   a seat lifter configured to adjust a height of the seat cushion by a rotational motion of a link connecting the seat cushion to the base; and
   a fixture of a seat belt, the fixture being attached to the link, wherein
   the fixture is positioned on an attachment face portion of the link, the attachment face portion being configure such that a surface of the attachment face portion faces toward a diagonal upper side, and the link is provided with protrusions abutting the fixture from two sides in a rotation direction such that the fixture is attached to the link in a state where a swing rotation of the fixture is restricted.

7. The vehicle seat according to claim 1, wherein:

the seat lifter includes four-joint link mechanisms configured to connect the seat cushion to the base by a pair of right and left front-side links and a pair of right and left rear-side links, and a drive unit configured to transmit a turning force and a brake force to any of the links constituting the four-joint link mechanisms; and the link to which the fixture is attached receives a brake force transmitted from the drive unit.

8. A vehicle seat comprising:

a seat cushion;

a base provided on a vehicle body;

a seat lifter configured to adjust a height of the seat cushion by a rotational motion of a link connecting the seat cushion to the base; and a fixture of a seat belt, the fixture being attached to the link, wherein the fixture is integrally attached to the link by a fastening structure including a projection portion formed in the fixture and a recesses portion formed in the link, the projection portion being fitted into the recessed portion such that the fixture is attached to the link in a state where a swing rotation of the fixture is restricted.

9. The vehicle seat according to claim 8, wherein the link is provided with protrusions abutting the fixture from two sides in a rotation direction.

* * * * *